STABILIZED POLYPHENYLENE ETHER RESIN COMPOSITIONS CONTAINING HINDERED TRIS-PHENOLS

This invention relates to improved compositions of a polyphenylene ether resin, an alkenyl aromatic resin that is modified with a rubber, and a hindered tris-phenol. Reinforced and flame-retardant compositions are also provided.

BACKGROUND OF THE INVENTION

The polyphenylene ether resins are a family of engineering thermoplastics that are well known to the polymer art. These polymers may be made by a variety of catalytic and non-catalytic processes from the corresponding phenols or reactive derivatives thereof. By way of illustration, certain of the polyphenylene ethers are disclosed in Hay, U.S. Pat. Nos. 3,306,874 and 3,306,875, and in Stamatoff, U.S. Pat. Nos. 3,257,357 and 3,256,358. In the Hay patents, the polyphenylene ethers are prepared by an oxidative coupling reaction comprising passing any oxygen-containing gas through a reaction solution of a phenol and a metal-amine complex catalyst. Other disclosures relating to processes for preparing polyphenylene ethers resins, including graft copolymers of polyphenylene ethers with styrene type compounds, are found in Fox, U.S. Pat. No. 3,356,761; Sumitomo, U.K. Pat. No. 1,291,609; Bussink et al., U.S. Pat. No. 3,337,892; Blanchard et al., U.S. Pat. No. 3,219,626; Laakso et al., U.S. Pat. No. 3,342,892; Borman, U.S. Pat. No. 3,344,116; Hori et al., U.S. Pat. No. 3,384,619; Faurote et al, U.S. Pat. No. 3,440,217; and Cooper et al., U.S. Pat. Nos. 3,661,848, 3,733,299, 3,838,102, and 3,988,297. Disclosures relating to metal based catalysts which do not include amines, are known from patents such as Wieden et al., U.S. Pat. No. 3,442,885 (copper-amidines); Nakashio et al., U.S. Pat. No. 3,573,257 (metal-alcholate or -phenolate); Kobyashi et al., U.S. Pat. No. 3,445,880 (cobalt chelates); and the like. In the Stamatoff patent, the polyphenylene ethers are produced by reacting the corresponding phenolate ion with an initiator, such as peroxy acid salt, and acid peroxide, a hypohalite, and the like, in the presence of a complexing agent. Disclosures relating to non-catalytic processes, such as oxidation with lead oxide, silver oxide, etc., are described in Price et al., U.S. Pat. No. 3,383,212. Cizek, U.S. Pat. No. 3,383,435 discloses polyphenylene ether-styrene resin compositions. All of the above-mentioned disclosures are incorporated by reference.

In the prior art, rubber-modified styrene resins have been admixed with polyphenylene ether resins to form compositions that have modified properties. The Cizek patent, U.S. Pat. No. 3,383,435, discloses rubber-modified styrene resin-polyphenylene ether resin compositions wherein the rubber component is of the unsaturated type such as polymers and copolymers of butadiene. The physical properties of these compositions are such that it appears that many of the properties of the styrene resins have been upgraded, while the moldability of the polyphenylene ethers are improved.

Hindered phenols have been employed as oxidation stabilizers for materials such as hydrocarbons, rubbers, polyolefins, and the like. Some of the advantages claimed are a reduction in the initial color or in the rate of oxygen absorption or carbonyl generation at high temperatures, and better retention of impact strength upon heat-aging. For example, Yamanouchi et al., U.S. Pat. No. 3,700,750, which is incorporated herein by reference, discloses the use of certain sterically hindered phenols in polyphenylene oxide compositions.

It has now been found that a composition of a polyphenylene ether resin, a rubber modified alkenyl aromatic resin, and a hindered tris-phenol, is a very useful thermoplastic molding material having good thermal oxidative stability and improved impact strength.

It is, therefore, a primary object of this invention to provide improved compositions that are based on polyphenylene ether resins, modified alkenyl aromatic resins, and hindered tris-phenols.

Another object of this invention is to provide molding compositions and molded articles that are based on a polyphenylene ether resin, a rubber modified alkenyl aromatic resin, and a hindered tris-phenol and that overall have slightly improved thermal oxidative stability.

Still another object of this invention is to provide molding compositions and molded articles that are based on a polyphenylene ether resin, a rubber modified alkenyl aromatic resin and a hindered tris-phenol and that have greatly improved impact strength.

It is also an object of this invention to provide the above-described, improved molding compositions in reinforced and/or flame-retardant embodiments.

DESCRIPTION OF THE INVENTION

The above-mentioned advantages and objects and others will be readily apparent to those skilled in the art by the following compositions.

Preferred types will include thermoplastic compositions which comprise:

(a) a polyphenylene ether resin;
(b) a rubber modified alkenyl aromatic resin; and
(c) a hindered tris-phenol having three hindered phenolic groups attached to a triazine ring.

The preferred polyphenylene ethers are of the formula

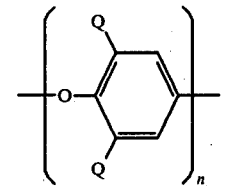

I wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals, and halohydrocarbonoxy radicals having at least two carbon atoms between the halogen atom and the phenyl nucleus.

Examples of polyphenylene ethers corresponding to the above formula can be found in the above-referenced patents of Hay and Stamatoff. Especially preferred is poly(2,6-dimethyl-1,4-phenylene) ether.

The alkenyl aromatic resin should have at least 25% of its units derived from an alkenyl aromatic monomer of the formula United States Patent [19] [11] 4,154,719
Abolins et al. [45] May 15, 1979

[54] STABILIZED POLYPHENYLENE ETHER RESIN COMPOSITIONS CONTAINING HINDERED TRIS-PHENOLS

[75] Inventors: Visvaldis Abolins; Glenn D. Cooper, both of Delmar, N.Y.

[73] Assignee: General Electric Company, Pittsfield, Mass.

[21] Appl. No.: 862,772

[22] Filed: Dec. 21, 1977

[51] Int. Cl.² .......................... C08K 7/14; C08L 7/00; C08L 25/04
[52] U.S. Cl. .............................. 260/42.18; 260/4 AR; 260/45.7 R; 260/45.7 P; 260/45.7 S; 260/45.75 B; 260/45.8 NT; 260/45.9 NP; 260/876 R; 260/876 B; 260/892
[58] Field of Search ................... 260/876 R, 45.8 NF, 260/4 AR, 42.18, 45.7 P, 45.7 R, 45.75, 45.9 NP, 892

[56] References Cited
U.S. PATENT DOCUMENTS

| | | | |
|---|---|---|---|
| 3,476,589 | 11/1969 | Raphael et al. | 260/874 |
| 3,637,582 | 1/1972 | Gilles | 260/45.8 NT |
| 3,639,506 | 2/1972 | Haaf | 260/876 R |
| 3,700,750 | 10/1972 | Yamanouchi et al. | 260/874 |
| 3,890,406 | 6/1975 | Matsunaga et al. | 260/876 R |
| 3,905,939 | 9/1975 | Dexter et al. | 260/45.8 NT |

*Primary Examiner*—J. Ziegler
*Attorney, Agent, or Firm*—Morgan, Finnegan, Pine, Foley & Lee

[57] ABSTRACT

Novel compositions are disclosed which include a plyphenylene ether resin, an alkenyl aromatic resin modified with a rubber, and a hindered tris-phenol as a stabilizer. Also included within the scope of this invention are reinforced and flame-retardant compositions of the polyphenylene ether resin, the alkenyl aromatic resin modified with a rubber, and the hindered tris-phenol.

37 Claims, No Drawings

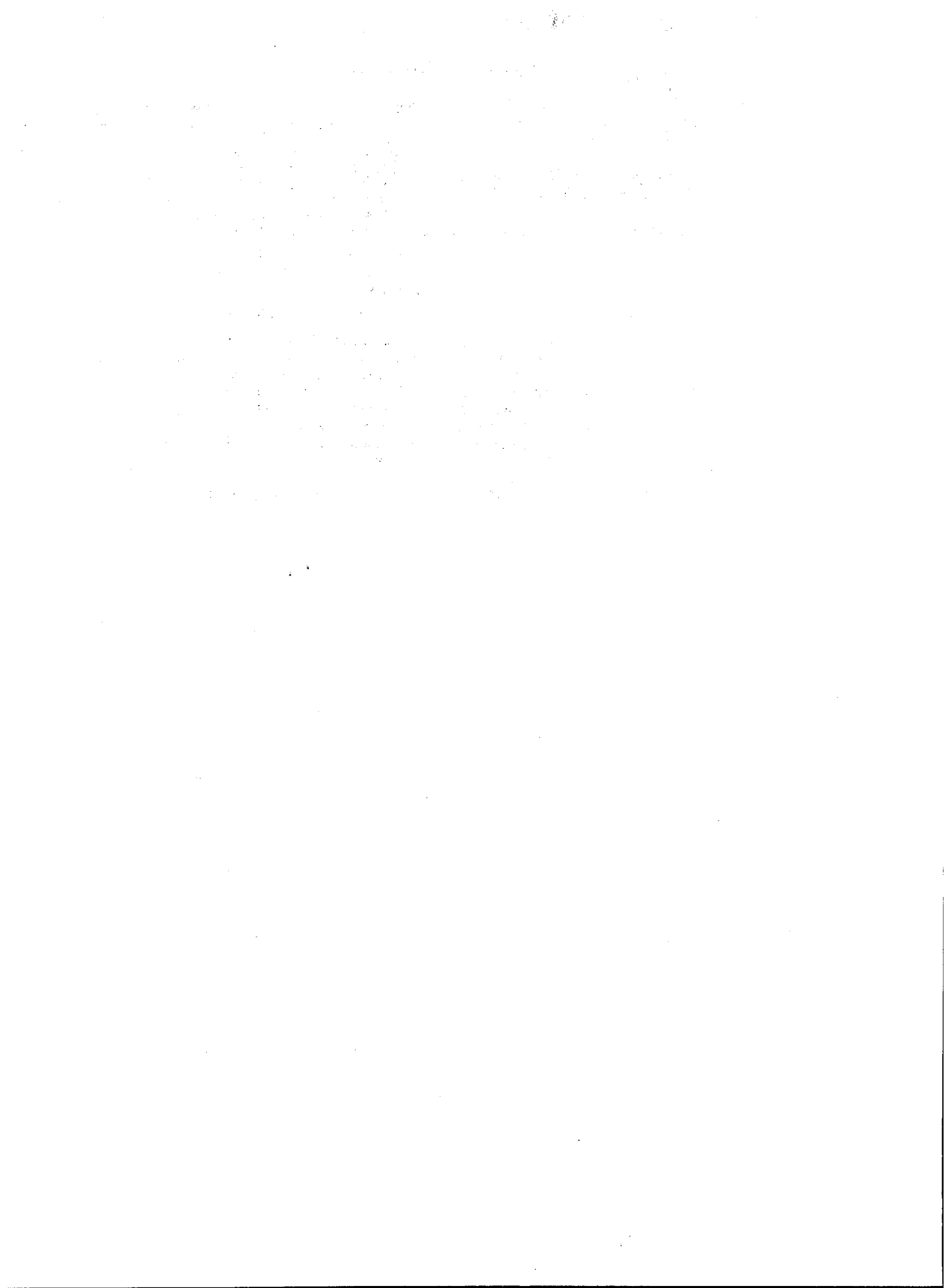

The compounds of Formulas IV and V include compounds such as 2,4,6-tris-(3',5'-di-tert-butyl-4-hydroxybenzyl)-1,3,5-triazine, which is sold under the tradename Goodrite 3114, and 3,5-di-tert-butyl-4-hydroxyhydrocinnamic acid triester with 1,3,5-tris-(2-hydroxyethyl-S-triazine,-2,4,6,(1H,3H,5H)-trione, which is sold under the tradename Goodrite 3125. Both are available from the B. F. Goodrich Chemical Co.

Components (a), (b), and (c) are combinable in a fairly wide range of proportions. Perferably, the compositions of this invention will comprise from about 20 to about 80 parts by weight of polyphenylene ether resin (a), from about 20 to about 80 parts by weight of rubber-modified alkenyl aromatic resin (b), and from about 0.1 to about 5 parts by weight of hindered tris-phenol (c), based on the total weight of the composition.

The compositions of the invention can also include other ingredients, such as flame retardants, extenders, processing aids, pigments, stabilizers, fillers such as mineral fillers and glass flakes and fibers, and the like. In particular, reinforcing fillers, in amounts sufficient to impart reinforcement, can be used, e.g., aluminum, iron or nickel, and the like, and non-metals, e.g., carbon filaments, silicates, such as acicular calcium silicate, asbestos, titanium dioxide, potassium titanate and titanate whiskers, glass flakes and fibers, and the like. It is to be understood that, unless the filler adds to the strength and stiffness of the composition, it is only a filler and not a reinforcing filler as contemplated herein. In particular, the reinforcing fillers increase the flexural strength, the flexural modulus, the tensile strength and the heat distortion temperature.

Although it is only necessary to have at least a reinforcing amount of the reinforcement present, in general, the combination of components (a), (b), and (c) will comprise from about 10 to about 90 parts by weight and the filler will comprise from about 10 to about 90 parts by weight of the total composition.

In particular, the preferred reinforcing fillers are of glass, and it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, by flame blowing, or by mechanical pulling. The preferred filaments for plastics reinforcement are made by mechanical pulling. The filament diameters range from about 0.000112 to 0.00075 inch, but this is not critical to the present invention.

In general, the best properties will be obtained if the sized filamentous glass reinforcement comprises from about 1 to about 80% by weight based on the combined weight of glass and polymers and preferably from about 10 to about 50% by weight. Especially preferably the glass will comprise from about 10 to about 40% by weight based on the combined weight of glass and resin. Generally, for direct molding use, up to about 60% of glass can be present without causing flow problems. However, it is useful also to prepare the compositions containing substantially greater quantities, e.g., up to 70 to 80% by weight of glass. These concentrates can then be custom blended with resin compositions that are not glass reinforced to provide any desired glass content of a lower value.

The length of the glass filaments and whether or not they are bundled into fibers and the fibers bundled in turn to yarns, ropes or rovings, or woven into mats, and the like, are also not critical to the invention. However, in preparing the present compositions it is convenient to use the filamentous glass in the form of chopped strands of from about ⅛" to about 1" long, preferably less than ¼" long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.005 and 0.125 inch.

Because it has been found that certain commonly used flammable sizings on the glass, e.g., dextrinized starch or synthetic polymers, contribute flammability often in greater proportion than expected from the amount present, it is preferred to use lightly sized or unsized glass reinforcements in those compositions of the present invention which are flame-retardant. Sizings, if present, can readily be removed by heat cleaning or other techniques well known to those skilled in the art.

It is also a feature of this invention to provide flame-retardant thermoplastic compositions, as defined above, by modifying the composition to include a flame-retardant additive in a minor proportion but in an amount at least sufficient to render the composition non-burning or self-extinguishing. Such flame-retardant compositions include a halogenated organic compound, a halogenated organic compound in admixture with an antimony compound, elemental phosphorus, a phosphorus compound, compounds containing phosphorus-nitrogen bonds, or a mixture of two or more of the foregoing.

When used herein, the terms "self-extinguishing", and "non-dripping" are used to describe compositions which meet the standards of Underwriters' Laboratories Bulletin No. 94. Another recognized procedure to determine flame resistance of resinous compositions is the Oxygen Index Test or LOI (Limiting Oxygen Index). This test is a measure of a product's combustibility based on the oxygen content of the combustion atmosphere. Appropriate specimens are placed in a combustion chimney, and the oxygen is reduced stepwise until the material no longer supports a flame. The LOI is defined as the percent oxygen times 100 divided by the sum of the percentages of nitrogen and oxygen in the gas used to burn the material under test. Further details of the Oxygen Index Test are found in ASTM test method D-2863. The compositions of this invention which contain flame-retardant additives in the specified amounts have a substantially higher oxygen index than the controls.

The flame-retardant additives useful in this invention comprise a family of chemical compounds well known to those skilled in the art. Generally speaking, the more important of these compounds contain chemical elements employed for their ability to impart flame resistance, e.g., bromine, chlorine, antimony, phosphorus, and nitrogen. It is preferred that the flame-retardant additive comprise a halogenated organic compound (brominated or chlorinated); a halogen-containing organic compound in admixture with antimony oxide; elemental phosphorus or a phosphorus compound; a halogen-containing compound in admixture with a phosphorus compound or compounds containing phosphorus-nitrogen bonds; or a mixture of two or more of the foregoing.

The amount of flame-retardant additive used is not critical to the invention, so long as it is present in a minor proportion based on the polyphenylene ether-modified alkenyl aromatic polymer composition—major proportions will detract from physical properties—but at least sufficient to render the composition self-extinguishing. Those skill in the art are well aware that the amount will vary with the nature of the polymers in the composition and with the efficiency of the additive. In general, however, the amount of additive will be from about 0.5 to 50 parts by weight per hundred parts of components (a), (b), and (c). A preferred range will be from about 1 to 25 parts, and an especially preferred range will be from about 3 to 15 parts of additive per hundred parts of (a), (b), and (c). Smaller amounts of compounds highly concentrated in the elements responsible for flame retardance will be sufficient, e.g., elemental red phosphorus will be preferred at about 0.5 to 10 parts by weight per hundred parts of (a), (b), and (c), while phosphorus in the form of triphenyl phosphate will be used at about 3 to 25 parts of phosphate per hundred parts of (a), (b), and (c), and so forth. Halogenated aromatics will be used at about 2 to 20 parts and synergists, e.g., antimony oxide, will be used at about 1 to 10 parts by weight per hundred parts of components (a), (b), and (c).

Among the useful halogen-containing compounds are those of the formula

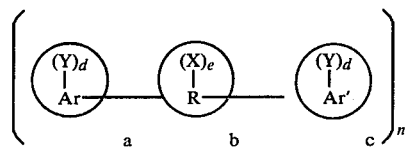

VI wherein n is 1 to 10 and R is an alkylene, alkylidene, or cycloaliphatic linkage, e.g., methylene, ethylene, propylene, isopropylene, isopropylidene, butylene, isobutylene, amylene, cyclohexylene, cyclopentylidene, and the like; or a linkage selected from the group consisting of ether; carbonyl; amine; a sulfur-containing linkage, e.g., sulfide, sulfoxide, or sulfone; carbonate; a phosphorus-containing linkage; and the like. R can also consist of two or more alkylene or alkylidene linkages connected by such groups as aromatic, amino, ether, ester, carbonyl, sulfide, sulfoxide, sulfone, a phosphorus-containing linkage, and the like. R can be dihydric phenol, e.g., bisphenol-A, carbonate linkage. Other groups which are represented by R will occur to those skilled in the art. Compounds of this type are disclosed in U.S. Pat. Nos. 3,647,747 and 3,334,154, both of which are incorporated herein by reference.

Ar and Ar' are mono- or polycarbocyclic aromatic groups such as phenyl, biphenyl, terphenyl, napthyl, and the like. Ar and Ar' may be the same or different.

X is a monovalent hydrocarbon group exemplified by the following: alkyl groups, such as methyl, ethyl, propyl, isopropyl, butyl, decyl, and the like; aryl groups, such as phenyl, naphthyl, biphenyl, xylyl, tolyl, and the like; aralkyl groups, such as benzyl, ethylphenyl, and the like; cycloaliphatic groups, such as cyclopentyl, cyclohexyl, and the like; as well as monovalent hydrocarbon groups containing inert substituents therein. It will be understood that where more than one X is used, they may be alike or different.

Y is a substituent selected from the group consisting of organic, inorganic, and organometallic radicals. The substituents represented by Y include (1) halogen, e.g., chlorine, bromine, iodine, or flourine, (2) ether groups of the general formual OE, wherein E is a monovalent hydrocarbon radical similar to X, (3) monovalent hydrocarbon groups of the type represented by R, and (4) other substituents, e.g., nitro, cyano, etc., said substituents being essentially inert provided there by at least one and preferably two halogen atoms per aryl, e.g., phenyl, nucleus.

The letter d represents a whole number ranging from 1 to a maximum equivalent to the number of replaceable hydrogens substituted on the aromatic rings comprising Ar or Ar'. The letter e represents a whole number ranging from 0 to a maximum controlled by the number of replaceable hydrogens on R. The letters a, b, and c represent whole numbers including 0. When b is not 0, neither a nor c may be 0, and when b is 0, either a or c, but not both, may be 0. Where b is 0, the aromatic groups are joined by direct carbon-carbon bond.

The hydroxyl and Y substituents on the aromatic groups, Ar and Ar', can be varied in the ortho, meta, or para positions on the aromatic rings, and the groups can be in any possible geometric relationship with respect to one another.

Included within the scope of the above formula are di-aromatics of which the following are representative.

2,2-bis-(3,5-dichlorophenyl)propane
bis-(2-chlorophenyl)methane
bis-(2,6-dibromophenyl)methane
1,1-bis-(4-iodophenyl)ethane
1,2-bis-(2,6-dichlorophenyl)ethane
1,1-bis-(2-chloro-4-iodophenyl)ethane
1,1-bis-(2-chloro-4-methylphenyl)ethane
1,1-bis-(3,5-dichlorophenyl)ethane
2,2-bis-(3-phenyl-4-bromophenyl)ethane
2,3-bis-(4,6-dichloronaphthyl)propane
2,2-bis-(2,6-dichlorophenyl)pentane
2,2-bis-(3,5-dichromophenyl)hexane
bis-(4-chlorophenyl)phenylmethane
bis-(3,5-dichlorophenyl)cyclohexylmethane
bis-(3-nitro-4-bromophenyl)methane
bis-(4-hydroxy-2,6-dichloro-3-methoxyphenyl)methane
2,2-bis-(3,5-dichloro-4-hydroxyphenyl)propane
2,2-bis-(3-bromo-4-hydroxyphenyl)propane The preparation of these and other applicable biphenyls are known in the art. In the above examples sulfide, sulfoxy, and the like may be substituted in place of the divalent aliphatic group.

Included within the above structural formula are substituted benzenes exemplified by tetrabromobenzene, hexachlorobenzene, hexabromobenzene, and biphenyls such as 2,2'-dichlorobiphenyl, 2,4'-dibromobiphenyl, 2,4'-dichlorobiphenyl, hexabromobiphenyl, octobromobiphenyl, decabromobiphenyl, and halogenated diphenyl ethers containing from 2 to 10 halogen atoms.

The preferred halogen compounds for this invention are aromatic halogen compounds such as chlorinated benzene, brominated benzene, chlorinated biphenyl, chlorinated terphenyl, brominated biphenyl, brominated terphenyl, or a compound comprising two phenyl radicals separated by a divalent alkylene group and having at least two chlorine or bromine atoms per phenyl nucleus, or mixtures of at least two of the foregoing.

Especially preferred are hexabromobenzene and chlorinated biphenyls or terphenyls, alone or mixed with antimony oxide.

In general, the preferred phosphorus compounds are selected from the group of elemental phosphorus and organic phosphonic acids, phosphonates, phoshpine oxides, phosphines, phosphites, and phosphates. Illustrative is triphenyl phosphine oxide. These can be used alone or mixed with hexabromobenzene or a chlorinated biphenyl and, optionally, antimony oxide.

Typical of the preferred phosphorus compounds to be employed in this invention would be those having the general formula

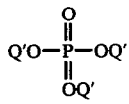

and nitrogen analogs thereof where each $Q'$ represents the same or different radicals including hydrocarbon radicals such as alkyl, cycloakyl, aryl, alkyl substituted aryl, and aryl substituted alkyl; halogen; hydrogen; and combinations thereof provided that at least one said $Q'$ is aryl. Typical examples of suitable phosphates include phenylbisdodecyl phosphate, phenylbisneopentyl phosphate, phenylethylene hydrogen phosphate, phenylbis-(3,5,5'-trimethylhexyl phosphate), ethyl-diphenyl phosphate, bis(2-ethylhexyl) p-tolyphosphate, tritolyl phosphate, bis-(2-ethylhexyl)-phenyl phosphate, tri(nonylphenyl) phosphate, phenylmethyl hydrogen phosphate, di(dodecyl) p-tolyl phosphate, tricresyl phosphate, triphenyl phosphate, halogenated triphenyl phosphate, dibutylphenyl phosphate, 2-chloroethyldiphenyl phosphate, p-tolyl bis (2,5,5'-trimethylhexyl) phosphate, 2-ethylhexyldiphenyl phosphate, diphenyl hydrogen phosphate, and the like. The preferred phosphates are those where each $Q'$ is aryl. The most preferred phosphate is triphenyl phosphate. It is also preferred to use triphenyl phosphate in combination with hexabromobenzene and, optionally, antimony oxide. Especially preferred is a composition comprised of mixed triaryl phosphates with one or more isopropyl groups on some or all of the aryl rings, such as Kronitex 50 supplied by Food Machinery Corporation.

Also suitable as flame-retardant additives for this invention are compounds containing phosphorus-nitrogen bonds, such as phosphonitrilic chloride, phosphorus ester amides, phosphoric acid amides or phosphonic acid amides. Those flame-retardant additives are commercially available.

The compositions of the invention may be formed by conventional techniques, that is, by first dry mixing the components to form a premix, and then passing the premix through an extruder at an elevated temperature, e.g., 425° to 640° F.

By way of illustration, glass roving (a bundle of strands of filaments) is chopped into small pieces, e.g., ⅛" to 1" in length, and preferably less than ¼" in length and put into an extrusion compounder with (a) the polyphenylene ether resin, (b) the rubber modified aromatic resin, (c) the hindered tris-phenol, and (d) the flame-retardant additive(s), to produce molding pellets. The fibers are shortened and predispersed in the process, coming out at less than 1/16" long. In another procedure, glass filaments are ground or milled to short lengths, are mixed with the polyphenylene ether resin, the modified alkenyl aromatic polymer, the hindered tris-phenol, and, optionally, flame-retardant additive(s), by dry blending, and then are either fluxed on a mill and ground, or are extruded and chopped.

In addition, compounding should be carried out to insure that the residence time in the machine is short; that the temperature is carefully controlled; that the frictional heat is utilized; and that an intimate mixture between the resins and additives is obtained.

DESCRIPTION OF THE PREFERRED EMBODIMENTS

The following examples are set forth as further illustration of the invention and are not to be construed as limiting the invention thereto.

EXAMPLE I

Methanol Precipitated PPO 2,6-xylenol was oxidized in toluene solution, using a cupric chloride-sodium bromide-dibutyl amine catalyst. The reaction mixture was thoroughly mixed with an aqueous solution of the trisodium salt of ethylenediaminetetraacetic acid, and the polymer, poly (2,6-dimethyl-1,4-phenylene) ether (PPO), was precipitated by the addition of methanol. The PPO was filtered off, washed with methanol, and dried. It had an intrinsic viscosity of 0.46 dl/g and contained 35 ppm of copper.

Spray-dried PPO

Xylenol was oxidized in toluene solution as described above. The mixture was stirred with aqueous acetic acid, and a light phase that formed was poured off. The polymer was isolated by spray-drying in a nitrogen atmosphere. The polymer was dark red in color, contained 650 ppm of copper, and had an intrinsic viscosity of 0.48 dl/g.

Hydrogenated-crumbed PPO

Xylenol was oxidized in toluene and mixed with aqueous trisodium EDTA as described above. The mixture was then centrifuged, and the aqueous phase was discarded. The toluene solution was then heated at 300° F., under 300 psi hydrogen pressure for one hour over a palladium catalyst (0.5% Pd on alumina). The polymer was isolated by spraying the hydrogenated mixture into a large volume of hot water. It had an intrinsic viscosity of 0.40 dl/g.

EXAMPLE II

Two hundred and fifty grams of hydrogenated, crumbed PPO, 250 g of FG-834 (a rubber-modified polystyrene, available from Foster Grant Co.), 15 g of triphenyl phosphate, and 25 g of titanium dioxide were mixed together and extruded in a 28 mm Werner-Pfleiderer twin-screw extruder (barrel temperature 600° F.). The extruded pellets were molded in standard test pieces on a 3 oz. Newbury injection molding machine (barrel 500° F., mold 180° F.). A second composition was prepared in the same way, with the addition of 5 g of Goodride 3114 (2,4,6-tris-(3, '5'-di-tert-butyl-4-hydroxybenzyl)-1,3,5 triazine. The sample without the phenol embrittled in less than four days at 115° C.; the composition containing the hindered phenol remained ductile for 14 days.

EXAMPLE III

Compositions comprised 50:50 of PPO and FG-834 polystyrene were prepared, extruded and molded as described in Examples I and II, with the addition in each case of 1.0 phr of tridecyl phosphite, 0.15 phr of zinc sulfide, and 0.15 phr of zinc oxide. Properties are listed in the following table:

TABLE 1[a]

| PPO Source | PHENOL | Izod Impact (ft. lbs/in. notch) | Gardner Impact (in. lbs.) | Time to embrittlement (days at 115° C.) |
|---|---|---|---|---|
| Methanol-pptd | — | 2.4 | 100 | 25–30 |
| Methanol-pptd | Goodrite 3114[b] (1phr) | 3.0 | 200 | 32–36 |
| Methanol-pptd | Goodrite 2125[c] (1 phr) | 3.0 | 175 | 32–36 |
| Spray-dried | — | 3.3 | 80 | 5–6 |
| Spray-dried | Goodrite 3114 (0.5 phr) | 3.4 | 150 | 7–9 |
| Hydrogenated crumbed | — | 1.6 | 50 | 14–16 |
| Hydrogenated crumbed | Goodrite 3114 (1 phr) | 1.8 | 75 | 14–16 |

[a]Compositions also contain 3 phr triphenyl phosphate and 5 phr titanium dioxide.
[b]2,4,6-tris-(3',5'-di-tert-butyl-4' hydroxybenzyl)-1,3,5-triazine
[c]3,5-di-tert-butyl-4-hydroxyhydrocinnamic acid triester with 1,3,5-tris-(2-hydroxyethyl-S-triazine,-2,4,6,(1H, 3H, 5H)-trione, available from B. F. Goodrich Chemical Co.

EXAMPLE IV

A PPO reaction mixture, prepared in toluene solution with a cupric chloride-sodium bromide-dibutyl amine catalyst, was extracted with an aqueous solution of the trisodium salt of ethylenediaminetetraacetic acid, and diluted to approximately 10% with toluene. The solution was then passed through a column packed with alumina to remove colored by-products of the reaction. The polymer was then isolated by spraying the solution into hot water to drive off the solvent, and the polymer was filtered off and dried under vacuum.

EXAMPLE V

Four hundred grams of the polymer prepared in Example IV, 400 g of rubber modified polystyrene (FG-834), 4 g of tridecyl phosphite, 12 g of low molecular weight polyethylene, 24 g of triphenyl phosphate, 1.2 g of zinc oxide, 1.2 g of zinc sulfide, and 40 g of titanium dioxide were blended together and extruded on a 28 mm W-P extruder. The extruded pellets were molded into standard test specimens, on a 3 oz. Newbury screw injection molding machine. Another composition, identical to the first except for the addition of 4 g (0.5 phr) of Goodrite 3114 hindered phenol, was similarly extruded and molded. The first material had notched Izod impact strength of 2.0 ft./lbs. in of notch and Gardner impact strength of 50 in. lbs.; the composition containing the phenolic stabilizer had notched Izod impact strength of 2.4 in. lbs. and Gardner impact strength of 150 in. lbs.

EXAMPLE VI

A composition of 70 parts PPO (methanol precipitated), 30 parts rubber modified polystyrene, 10 parts triphenyl phosphate and 2 parts titanium dioxide was extruded and molded as described in Example V. Another composition, identical to the first except for the addition of one part Goodrite 3114 hindered phenol, was similarly extruded and molded. The first composition had Gardner impact strength of 135 in. lbs. and notched Izod impact strength of 2.6 ft. lbs./in. of notch; the composition containing Goodrite 3114 had Gardner impact of 210 in. lbs. and notched Izod impact strength of 2.7 ft. lbs./in. of notch.

EXAMPLE VII

PPO was prepared according to procedure described in Cooper, U.S. Pat. No. 4,059,568. A ten gallon stainless steel reactor was charged with four gallons of toluene. A catalyst solution prepared by adding 40.7 g of bromine to 52.4 g of 2,6-xylenol and 3.53 g of cuprous oxide in 300 ml of methanol was added, followed by 3130 ml of methanol containing 5.4% water, 105.6 g of dimethylbutyl amine, 55 g of di-n-butyl amine, 5.5 g of methyltrioctyl ammonium chloride and 17.94 g of N,N'-di-tertbutylethylene diamine. A rapid stream of oxygen was introduced, and a solution of 12.2 lbs. of 2,6-xylenol in an equal weight of toluene was added to the vigorously stirred mixture over a period of 40 minutes. The temperature was maintained at 105° F., and after 70 minutes reaction two liters of toluene and 96.7 g of a 38% solution of the trisodium salt of ethylene diamine tetraacetic acid was added, with 2.0 liters of water. The mixture was centrifuged, and the PPO was isolated from the organic phase by precipitation with methanol.

A composition comprising 55 parts of the PPO prepared as described above, 45 parts of FG-834 polystyrene, 1 part of tridecyl phosphate, 3 parts of triphenyl phosphate, 1.5 parts of polyethylene, and 5 parts of titanium dioxide was extruded and molded as described in Example II. It had Izod impact strength of 3.4 ft.lbs./in. of notch and Gardner impact strength of 180 in. lbs. A second composition, prepared in the same way, but with the addition of 0.5 parts of Goodrite 3114 hindered trisphenol, had Izod impact strength of 3.8 ft.lbs./in. of notch and Gardner impact strength of 200 in.lbs.

It can be seen from the above examples that polyphenylene ether compositions containing a hindered tris-phenol have significantly improved Gardner impact strength and increased time to brittlement.

Obviously, other modifications and variations of the present invention are possible in the light of the above teachings. It is, therefore, to be understood that changes may be made in the particular embodiments described above which are within the full intended scope of the invention as defined in the appended claims.

We claim:

1. A thermoplastic molding composition having improved impact strength and comprising in intimate admixture
   (a) a polyphenylene ether resin;
   (b) an alkenyl aromatic resin modified with a rubbery diene polymer; and
   (c) a hindered tris-phenol having three phenolic groups attached to a triazine ring.

2. The molding composition of claim 1 wherein the alkenyl aromatic resin is modified with a rubbery interpolymer of butadiene.

3. The molding composition of claim 1 wherein the polyphenylene ether resin is selected from the compounds of the formula

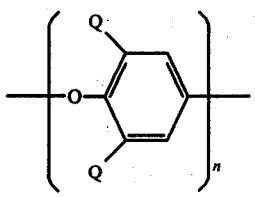

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals, and the halohydrocarbonoxy radicals having at least two carbon atoms between the halogen atom and the phenyl nucleus.

4. The molding composition of claim 1 wherein the alkenyl aromatic resin is prepared from a monomer selected from the group consisting of styrene, α-methylstyrene, bromostyrene, chlorostyrene, divinylbenzene, and vinyltoluene.

5. The molding composition of claim 1 wherein the hindered tris-phenol is a compound of formula

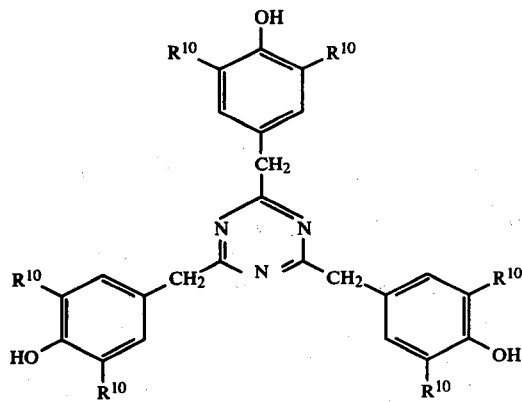

wherein $R^{10}$ may be an alkyl radical having from one to about ten carbon atoms, or of formula

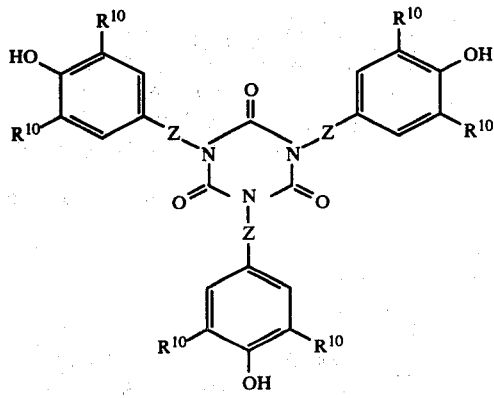

wherein $R^{10}$ is as defined above and Z is an alkylene radical of from one to about six carbon atoms, a dialkylene carboxy radical of from two to about thirteen carbon atoms, or a dialkylenoxy oxide radical of from two to about twelve carbon atoms.

6. The molding composition of claim 5 wherein $R^{10}$ is selected from the group of methyl, ethyl, isopropyl, n-propyl, n-butyl, isobutyl, tert-butyl, and tert-octyl radicals.

7. The molding composition of claim 6 wherein $R^{10}$ is a tert-butyl radical.

8. The molding composition of claim 5 wherein Z is selected from the group of methylene, ethylene, n-propylene, and n-butylene radicals and radicals of the formulas $-R^{11}-O-R^{12}-$ and

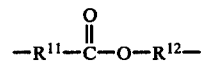

wherein $R^{11}$ and $R^{12}$, which may be the same or different, each represent an alkylene radical of from one to about six carbon atoms.

9. The molding composition of claim 8 wherein Z is a dimethylene oxide, methylenoxy ethylene, diethylene oxide, methylencarboxylmethylene, or methylencarboxylethylene radical.

10. The molding composition of claim 8 wherein Z is a methylene, ethylene, or n-propylene radical.

11. The molding composition of claim 1 wherein the composition includes a reinforcing amount of an inorganic reinforcing filler.

12. The molding composition of claim 11 wherein the composition includes from about 10 to about 50% by weight of fibrous glass filaments, based on the total weight of the composition.

13. The molding composition of claim 1 wherein the composition includes a flame-retardant amount of a flame-retardant additive.

14. The molding composition of claim 13 wherein the flame retardant is a halogenated organic compound, a halogenated organic compound in admixture with an antimony compound, elemental phosphorus, a phosphorus compound, compounds containing phosphorus-nitrogen bonds, or a mixture of two or more of the foregoing.

15. A thermoplastic molding composition having improved impact strength and comprising in intimate admixture
(a) from about 20 to about 80 parts by weight of a polyphenylene ether resin;
(b) from about 20 to about 80 parts by weight of an alkenyl aromatic resin modified with a rubbery diene polymer;
(c) from about 0.1 to about 5 parts by weight of a hindered tris-phenol having three phenolic groups attached to a triazine ring, based on the weight of the total composition.

16. The molding composition of claim 15 wherein the polyphenylene ether resin is poly (2,6-dimethyl-phenylene) ether.

17. The molding composition of claim 15 wherein the rubbery diene polymer comprises polybutadiene.

18. The molding composition of claim 15, wherein the alkenyl aromatic resin is styrene and said rubbery diene polymer is present between about 4% and about 25% by weight of styrene and rubbery diene polymer combined.

19. A thermoplastic molding composition having improved impact strength and comprising in intimate admixture (a) from about 20 to about 80 parts by weight of a polyphenylene ether resin;

(b) from about 20 to about 80 parts by weight of an alkenyl aromatic resin modified with a rubbery diene polymer;

(c) from about 0.1 to about 5 parts by weight of a hindered tris-phenol having three phenolic groups attached to a triazine ring; and (d) a reinforcing amount of an inorganic reinforcing filler.

20. The molding composition of claim 19 wherein the polyphenylene ether resin is poly (2,6-dimethyl-1,4-phenylene) ether.

21. The molding composition of claim 19 wherein the rubbery diene polymer comprises polybutadiene.

22. The molding composition of claim 1 wherein the reinforcing filler comprises from about 10 to about 50% of fibrous glass filaments, based on the total weight of the composition.

23. A thermoplastic molding composition having improved impact strength and comprising in intimate admixture (a) from about 20 to about 80 parts by weight of a polyphenylene ether resin;

(b) from about 20 to about 80 parts by weight of an alkenyl aromatic resin modified with a rubbery diene polymer;

(c) from about 0.1 to about 5 parts by weight of a hindered tris-phenol having three phenolic groups attached to a triazine ring; and (d) a flame-retardant amount of a flame-retardant additive.

24. The molding composition of claim 23 wherein the rubbery diene polymer comprises polybutadiene.

25. The molding composition of claim 23 wherein the flame-retardant additive is a halogenated organic compound, a halogenated organic compound in admixture with an antimony compound, elemental phosphorus, a phosphorus compound, compounds containing phosphorus-nitrogen bonds, or a mixture of two or more of the foregoing.

26. The molding composition of claim 23 wherein the flame-retardant additive comprises a mixture of an organic bromine-containing compound with antimony oxide.

27. The molding composition of claim 23 wherein the flame-retardant additive is triphenylphosphate.

28. The molding composition of claim 23 wherein the flame-retardant additive is comprised of a mixture of triaryl phosphates wherein one or more aryl groups are substituted by one or more isopropyl groups.

29. A thermoplastic molding composition having improved impact strength and comprising in intimate admixture (a) a polyphenylene ether resin;

(b) an alkenyl aromatic resin modified with a rubbery diene polymer; and (c) a hindered tris-phenol of formula

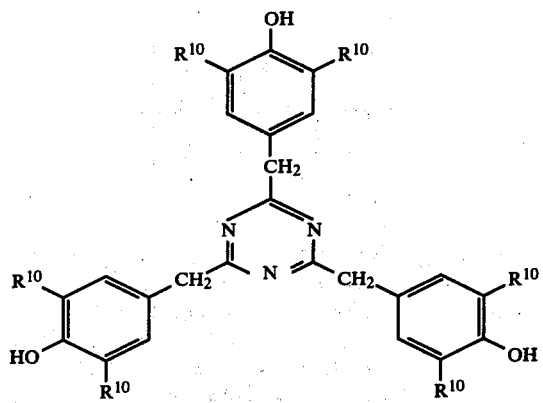

wherein $R^{10}$ may be an alkyl radical having from one to about ten carbon atoms, or of formula

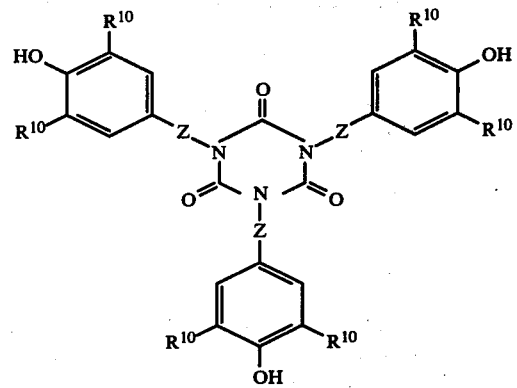

wherein $R^{10}$ is as defined above and Z is an alkylene radical of from one to about six carbon atoms.

30. The molding composition of claim 29 wherein, in the hindered tris-phenol (c), Z is a methylene radical.

31. A thermoplastic molding composition having improved impact strength and comprising in intimate admixture (a) from about 20 to about 80 parts by weight of a polyphenylene ether resin;

(b) from about 20 to about 80 parts by weight of an alkenyl aromatic resin modified with a rubbery diene polymer;

(c) from about 0.1 to about 5 parts by weight of a hindered tris-phenol selected from the compounds set forth in claim 29, based on the weight of the total composition.

32. The molding composition of claim 31 wherein, in the hindered tris-phenol (c), Z is a methylene radical.

33. A thermoplastic molding composition having improved impact strength and comprising in intimate admixture (a) from about 20 to about 80 parts by weight of a polyphenylene ether resin;

(b) from about 20 to about 80 parts by weight of an alkenyl aromatic resin modified with a rubbery diene polymer;

(c) from about 0.1 to about 5 parts by weight of a hindered tris-phenol selected from the compounds set forth in claim 29, based on the weight of the total composition; and (d) a reinforcing amount of an inorganic reinforcing filler.

34. The molding composition of claim 33 wherein, in the hindered tris-phenol (c), Z is a methylene radical.

35. A thermoplastic molding composition having improved impact strength and comprising in intimate admixture
  (a) from about 20 to about 80 parts by weight of a polyphenylene ether resin;
  (b) from about 20 to about 80 parts by weight of an alkenyl aromatic resin modified with a rubbery diene polymer;
  (c) from about 0.1 to about 5 parts by weight of a hindered tris-phenol selected from the compounds set forth in claim 29, based on the weight of the total composition; and
  (d) a flame-retardant amount of a flame-retardant additive.

36. The molding composition of claim 35 wherein, in the hindered tris-phenol (c), Z is a methylene radical.

37. A thermoplastic molding composition having improved impact strength and comprising in intimate admixture
  (a) a polyphenylene ether resin;
  (b) an alkenyl aromatic resin that is modified with a rubbery diene polymer by polymerizing alkenyl aromatic monomer in the presence of the rubbery diene polymer; and
  (c) a hindered tris-phenol selected from the compounds set forth in claim 29.

* * * * *

UNITED STATES PATENT AND TRADEMARK OFFICE
CERTIFICATE OF CORRECTION

PATENT NO. : 4,154,719
DATED : May 15, 1979
INVENTOR(S) : Visvaldis Abolins & Glenn D. Cooper It is certified that error appears in the above-identified patent and that said Letters Patent are hereby corrected as shown below:

Abstract, 2nd line, "plyphenylene" should read -- polyphenylene --.

Col. 3, line 52, "sytrene-" should read -- styrene- --.

Col. 7, line 7, "skill" should read -- skilled --.

Col. 9, line 6, "phoshpine" should read -- phosphine --.

Col. 9, line 49, "those" should read -- these --.

Col. 11, line 14, Table, "Goodrite $2125^C$" should read -- Goodrite $3125^C$ --.

Col. 12, line 31, "phosphate" should read -- phosphite --.

Col. 15, line 19, "claim 1" should read -- claim 19 --.

Signed and Sealed this

Twenty-second Day of January 1980

[SEAL]

Attest:

SIDNEY A. DIAMOND

Attesting Officer

Commissioner of Patents and Trademarks